United States Patent
Hiromatsu

(10) Patent No.: US 7,173,234 B2
(45) Date of Patent: Feb. 6, 2007

(54) METHOD READING APPARATUS AND CONTROL METHOD THEREOF HAVING AN ILLUMINATION UNIT

(75) Inventor: Kenji Hiromatsu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 10/886,674

(22) Filed: Jul. 9, 2004

(65) Prior Publication Data

US 2004/0238722 A1 Dec. 2, 2004

Related U.S. Application Data

(62) Division of application No. 10/120,354, filed on Apr. 12, 2002.

(30) Foreign Application Priority Data

Apr. 19, 2001 (JP) ............... 2001-121019

(51) Int. Cl.
*G01J 3/50* (2006.01)
*H04N 1/46* (2006.01)

(52) U.S. Cl. ............... 250/226; 250/208.1; 358/509; 358/480; 358/515; 358/520

(58) Field of Classification Search ........... 250/214 C, 250/208.1, 205, 226; 358/475, 509; 235/455; 359/480

See application file for complete search history.

(56) References Cited

U.S. PATENT DOCUMENTS 5,212,376 A * 5/1993 Liang .................. 250/208.1
5,822,052 A * 10/1998 Tsai .................... 356/229
6,522,432 B1 * 2/2003 Lin ..................... 358/475
6,635,858 B2 * 10/2003 Spears ................. 250/208.1
6,744,469 B1 * 6/2004 Gudenburr et al. ......... 348/370
2002/0100863 A1 * 8/2002 Spears ................. 250/208.1

FOREIGN PATENT DOCUMENTS

| JP | 08-293620 | 11/1996 |
|---|---|---|
| JP | 09-214675 A | 8/1997 |
| JP | 2001-086297 | 3/2001 |

OTHER PUBLICATIONS

Office Action from a foreign counterpart dated Jan. 10, 2006.

* cited by examiner

*Primary Examiner*—Thanh X. Luu
*Assistant Examiner*—Stephen Yam
(74) *Attorney, Agent, or Firm*—Fitzpatrick, Cella, Harper & Scinto

(57) ABSTRACT

The deterioration of read-image quality caused by LED color-tone variations is suppressed in a case in which a white-color LED illumination module is used as a light source of a color-image reading apparatus. The color-image reading apparatus includes an illumination module formed of a plurality of white-color LEDs arranged in a main-scanning direction; an image sensor such as a CCD; a unit for moving the original and the image sensor relatively in a sub-scanning direction; and an input masking unit. The illumination module is formed of LEDs having the same color-tone rank. The color-image reading apparatus also includes a setting unit for setting a color-tone rank for the illumination module, and a control unit, such as a CPU, for switching a parameter of the input masking unit according to the color-tone rank.

11 Claims, 16 Drawing Sheets

MAIN-SCANNING DIRECTION

METHOD READING APPARATUS AND CONTROL METHOD THEREOF HAVING AN ILLUMINATION UNIT

This application is a division of U.S. application Ser. No. 10/120,354, filed Apr. 12, 2002.

BACKGROUND OF THE INVENTION

1. Field of the Invention

The present invention relates to image reading apparatuses, and more particularly, to an image reading apparatus having a plurality of light sources with different color tones from each other.

2. Description of the Related Art

White-color light emitted from a light source in an image reading apparatus is implemented by adding a plurality of light components. More specifically, a blue or ultraviolet electromagnetic wave (hereinafter simply called "light") emitted from a predetermined LED light source is incident on a phosphor member to be converted to light having other wavelengths, such as yellow light, and is added to other light components to obtain white-color light. Since the light-emission efficiency of the phosphor member varies according to the wavelength of light emitted from the light source, a slight change at wavelength produces a corresponding change in the amount of light emitted from the phosphor member. This latter amount also varies in accordance with the amount of phosphors included in the phosphor member. As a result, the obtained color tone differs from one white-color LED to another. (By "color tone" is meant color quality, such as a color combination, color shading, and color strength; or color tint, such as, for example, a tone difference in an HSV color space.) More precisely, common color tones are pure-white light, a white light with a yellowish tone, and a white light with a bluish tone. Since such differences in color tone can be visually recognized, they cannot be ignored.

When a color image is read without taking color-tone variations of light sources into consideration, a color-tone variation occurs in the resulting image data (at least as compared with data obtained using a different light source). In addition, since a color-tone variation occurs also among light-source modules serving as illumination means, color-reading quality deteriorates.

SUMMARY OF THE INVENTION

It is an object of the present invention to provide an image reading apparatus which suppresses the deterioration of read-image quality even if an image is read when color-tone variations occur in illumination means.

The foregoing object is achieved in one aspect of the present invention through the provision of an image reading apparatus including illumination means formed of a plurality of arranged light sources for illuminating an image to be read; photoelectric conversion means for reading an image to be read illuminated by the illumination means and for outputting a first signal; rank setting means for setting color-tone ranks for the plurality of light sources; signal compensation means for compensating the first signal output from the photoelectric conversion means; and control means for calculating first data according to the ranks and for controlling compensation performed by the signal compensation means, according to the first data.

The foregoing object is achieved in another aspect of the present invention through the provision of a control method for an image reading apparatus having illumination means formed of a plurality of arranged light sources for illuminating an image to be read, including the steps of setting color-tone ranks for the plurality of light sources; reading an image to be read illuminated by the illumination means and outputting a first signal; and calculating first data according to the ranks and controlling such that the output first signal is compensated according to the first data.

The foregoing object is achieved in still another aspect of the present invention through the provision of a program capable of being executed by an information processing apparatus, having a program code used for implementing the image processing method described above.

The foregoing object is achieved in yet another aspect of the present invention through the provision of a storage medium storing the program described above.

The foregoing object is achieved in still yet another aspect of the present invention through the provision of an image reading apparatus including illumination means formed of a plurality of light sources arranged in a first direction for illuminating an image to be read; photoelectric conversion means for reading an image to be read illuminated by the illumination means and for outputting a signal; and control means for controlling such that a second signal output from the photoelectric conversion means is compensated according to first data, where the first data is calculated by using a first signal output from the photoelectric conversion means and information related to the first direction.

The foregoing object is achieved in a further aspect of the present invention through the provision of a control method for an image reading apparatus having illumination means formed of a plurality of light sources arranged in a first direction, for illuminating an image to be read, including the steps of reading an image to be read illuminated by the illumination means and for outputting a signal; and controlling such that a second signal output from photoelectric conversion means is compensated according to first data, where the first data is calculated by using a first signal output from the photoelectric conversion means and information related to the first direction.

The foregoing object is achieved in a still further aspect of the present invention through the provision of a program capable of being executed by an information processing apparatus, having a program code used for implementing the image processing method described above.

The foregoing object is achieved in a yet further aspect of the present invention through the provision of a storage medium storing the program described above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Figure 1:
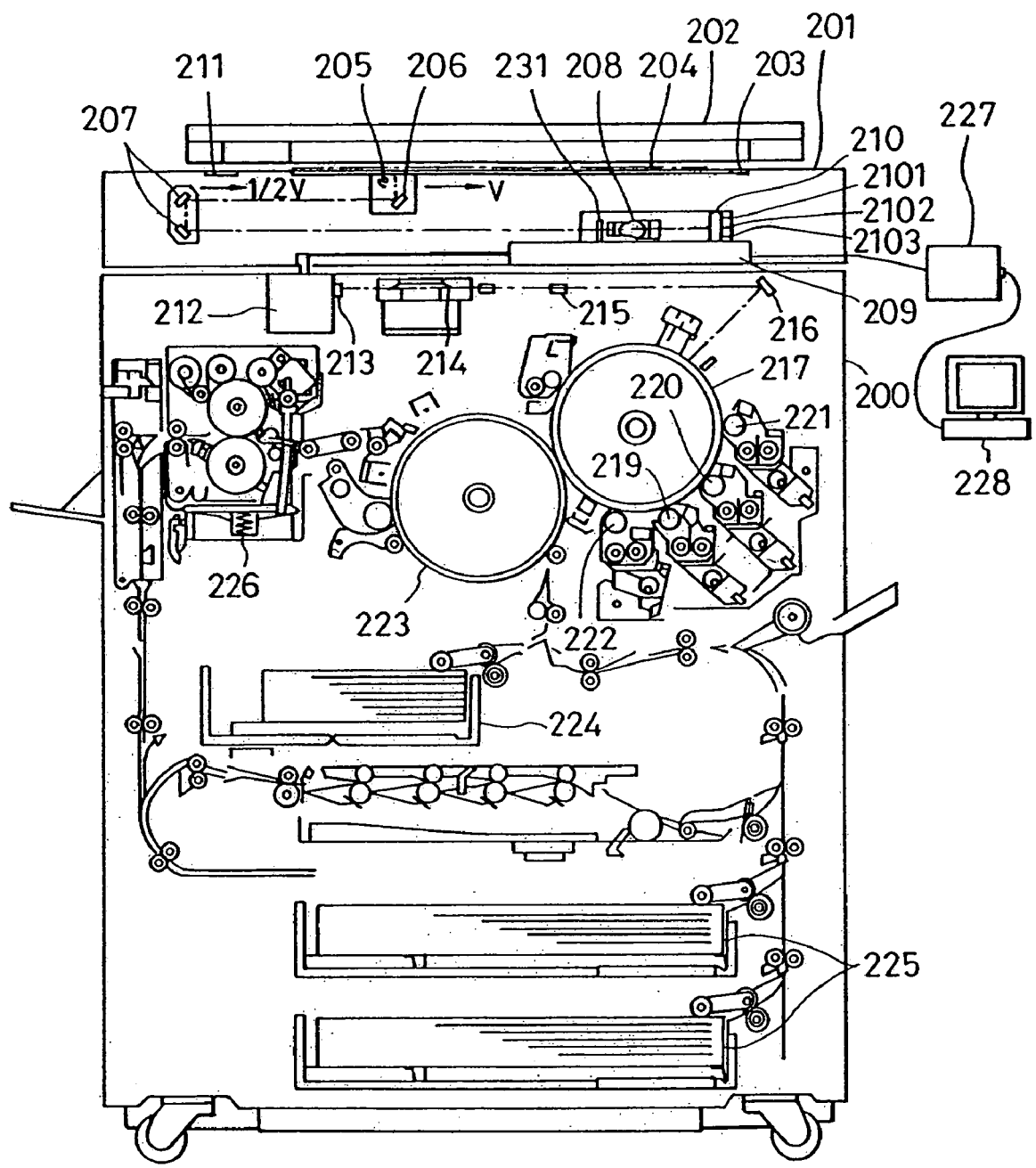
FIG. 1 is a sectional view of an image forming apparatus according to an embodiment of the present invention.

An embodiment of the present invention will be described below by referring to the drawings. A color copying machine, which is an image forming apparatus, serving as an image reading apparatus according to an embodiment of the present invention will be described first.

FIG. 1 is a sectional view of an image forming apparatus according to the present embodiment.

In FIG. 1, an image scanner section 201 reads the original and performs digital signal processing. A printer section 200 outputs an image corresponding to the original image read by the image scanner section 201, on a sheet in. full color.

In the image scanner section 201, an LED module 205 emits light to the original 204 disposed on an original-table glass (platen) 203 and pressed by a cover plate 202. Light reflected from the original 204 is sent to mirrors 206 and 207, and forms an image on three line sensors 210 (hereinafter collectively called a "CCD") after passing through a lens 208. The lens 208 is provided with an infrared cut filter 281.

The CCD 210 separates color optical information sent from the original 204 into red (R), green (G), and blue (B) components, and sends them to a signal processing section 209. Each color-component reading sensor string is formed of 5,000 pixels in the CCD 210. With this CCD 210, an A3-size original, which is the largest sheet placed on the original-table glass 203 in this embodiment, is read at a resolution of 400 dpi along its shorter side (of 297 mm).

The LED module 205 and the mirror 206 are mechanically moved at a speed V, and the mirror 207 is mechanically moved at a speed V/2, both in a direction (hereinafter called the "sub-scanning direction") perpendicular to an electrically scanning direction (hereinafter called the "main-scanning direction") of the line sensors 201 to scan the whole surface of the original 204. The required light source needs, first, to have a high light-emitting efficiency but a low power consumption, second, to allow the amount of emitted light to be changed according to its position in the main-scanning direction, and third to be a white-color light source. As a light source satisfying these three conditions, a white-color LED array can be considered. A plurality of white-color LEDs are arranged in the main scanning direction to illuminate the whole main-scanning area. To make end portions brighter than a central portion, it can be considered, for example, to use a method 1, in which the density of light-emitting devices is made higher at the end portions than at the central portion, a method 2, in which a higher current is made to flow into light-emitting devices at the end portions than at the central portion, and a method 3, in which a higher duty cycle is used at the end portions than at the central portion in PWM control.

Due to the following reason, LEDs are used as light sources in the present embodiment.

A tungsten-halogen lamp, a fluorescent lamp, or a xenon lamp is used in some cases as a light source for reading in copying machines and facsimile machines in which a CCD linear image sensor is used for reading.

A reduction optical system is formed, for example, such that an image of an A4 original, having a longer side of 297 mm, is formed on a CCD having 5,000 pixels each having a length of 10 μm, that is, on a 50-mm-long CCD. Due to lens characteristics, such as the cosine biquadrate law, it is bright at a central portion in the main-scanning direction, and it is relatively dark at end portions in the main-scanning direction. This nature directly reduces the SIN ratio of a signal component formed at the end portions in the main-scanning direction in a CCD output signal.

Since the number of filaments which emit light, their positions, and the number of windings in each filament can be relatively freely changed in a tungsten-halogen lamp, the foregoing issue is handled by increasing the numbers of windings in filaments as their positions approach the end portions to emit brighter light.

In terms of power consumption, a fluorescent lamp and a xenon lamp are superior to (useless than) a tungsten-halogen lamp. In addition, a fluorescent lamp and a xenon lamp have relatively high light-emitting efficiencies and are desirable in terms of protecting the environment. These lamps are, however, not capable of producing differing amounts of emitted light along the main-scanning direction, unlike a tungsten-halogen lamp.

A three-line color CCD image sensor is used in some cases for reading a document having colors in image reading apparatuses of copying machines. In an example structure, three photodiode strings disposed at an interval of four times a pixel pitch in the main-scanning direction are formed, and RGB color filters are provided for each string.

In this case, it is required for a light source for the original to emit light having a plurality of wavelengths from 400 nm to 700 nm, namely, to be a white-color light source.

The merits of using white-color LEDs, which have very increasing light-emitting efficiency and light-emitting luminance, have become clear.

A standard white-color plate 211 serves as a reference member for compensating for non-uniformity in the reading of images by the three line sensors 210 serving as photoelectric-conversion means and the lens 208. An image of the standard white-color plate 211 illuminated by the LED module 205 is read to generate compensation data used for compensating data read by R, G, and B sensors 2101, 2102, and 2103. The standard white-color plate 211 has an almost uniform reflection characteristic for visible light, and is white in visible light. The standard white-color plate 211 is used to compensate data output from the R, G, and B sensors 2101, 2102, and 2103.

The signal processing section 209 applies electric processing to a read signal to separate the latter into magenta (M), cyan (C), yellow (Y), and black (Bk) components, and sends them to the printer section 200. In one cycle of scanning performed in the image scanner section 201, one of the M, C, Y, and Bk components is sent to the printer section 200. A total of four cycles of scanning completes one-sheet print out.

In the printer section 200, each of M, C, Y, and Bk image signals sent from the image scanner section 201 is sent to a laser driver 212. The laser driver 212 modulation-drives a semiconductor laser 213 according to the received image signal. Laser light scans a photosensitive drum 217 through a polygonal mirror 214, an f-θ lens 215, and a mirror 216.

A developer section is formed of a magenta-color developer 219, a cyan-color developer 220, an yellow-color developer 221, and a black-color developer 222. These four developers alternately make a contact with the photosensitive drum 217 to develop M, C, Y, and Bk latent images formed on the photosensitive drum 217 with the corresponding toner. A transfer drum 223 winds a sheet supplied from a sheet cassette 224 or a sheet cassette 225 around the transfer drum 223 and transfers a toner image developed on the photosensitive drum 217 to the sheet.

After toner images for four colors, M, C, Y, and Bk, are sequentially transferred, the sheet passes through a fixing unit 226 and is discharged.

The image scanner section 201 according to the present embodiment will be described next in detail.

Figure 2:
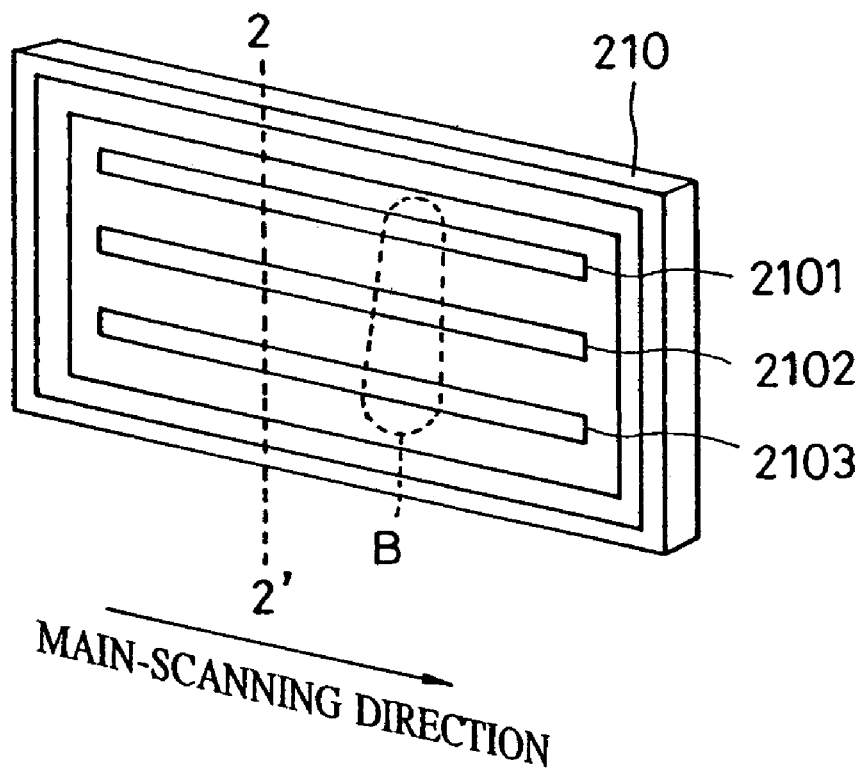
FIG. 2 is a perspective view of a CCD.

FIG. 2 is a perspective view of the CCD 210.

In FIG. 2, the R sensor 2101 is a light-receiving-device string (photosensor) for reading a red-light component, the G sensor 2102 is a light-receiving-device string (photosensor) for reading a green-light component, and the B sensor 2103 is a light-receiving-device string (photosensor) for reading a blue-light component.

The R, G, and B sensors 2101, 2102, and 2103 each have an opening 50 mm wide in the main-scanning direction and 10 μm in the sub-scanning direction.

The above three light-receiving-device strings having optical characteristics different from each other form a monolithic structure on the following silicon chip. In other words, the R, G, and B sensors are disposed parallel to each other so as to read the same line in the original.

With the use of the CCD 210 having such a structure, a common optical system, including the lens 208, for separating and reading each color is used. Therefore, optical adjustments for the R, G, and B light are made simple.

Figure 3:
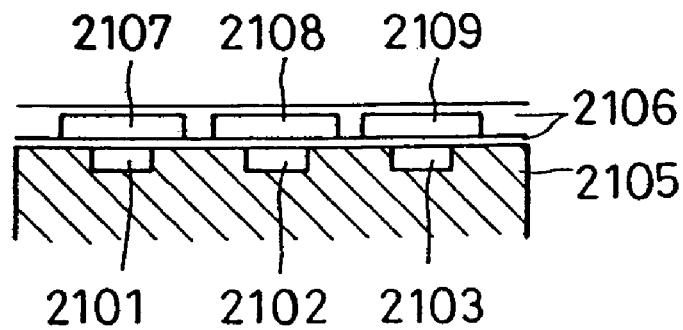
FIG. 3 is a sectional view of photosensors of the CCD, taken from line 2–2' in FIG. 2.

FIG. 3 is a sectional view of the photosensors.

As shown in FIG. 3, the photosensor 2101 for reading red color, the photosensor 2102 for reading green color, and the photosensor 2103 for reading blue color are disposed on a silicon substrate 2105.

Above the R photosensor 2101, an R filter 2107 for passing an R wavelength component of visible light is placed. In the same way, above the G photosensor 2102, a G filter 2108 is placed, and above the B photosensor 2103, a B filter 2109 is placed. There are also shown smoothing layers 2106 made from a transparent organic film.

Figure 4:
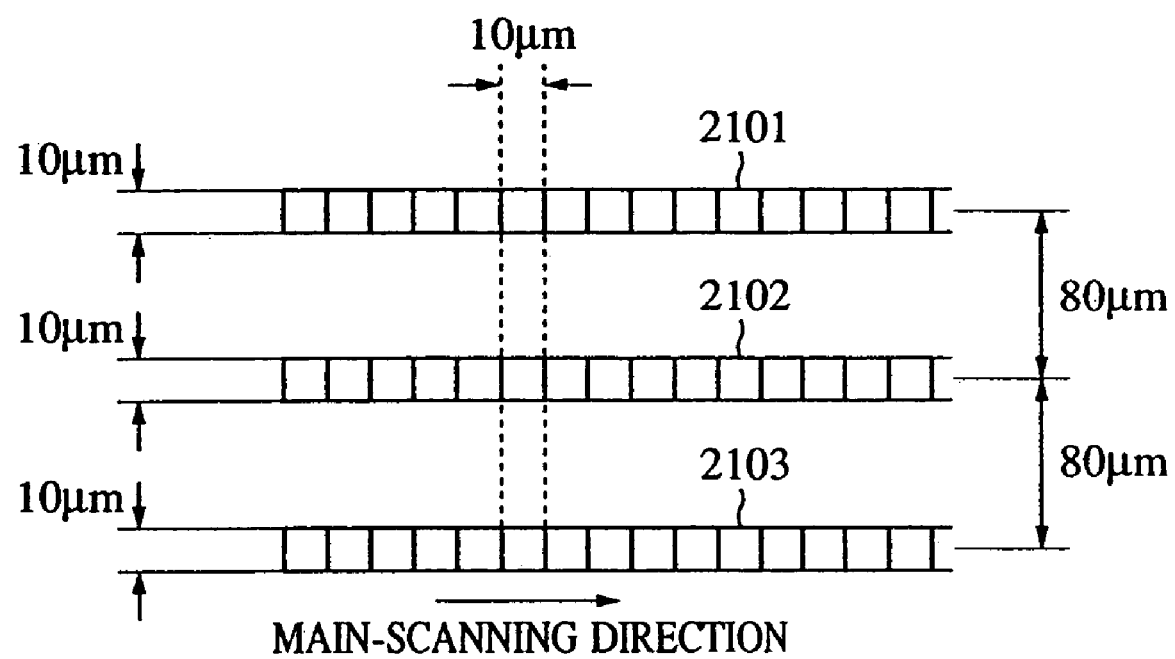
FIG. 4 is an enlarged view of the photosensors.

FIG. 4 is an enlarged view of parts of the photosensors 2101, 2102, and 2103, indicated by "B" in FIG. 2.

Each photosensor has 5,000 pixels each 10 μm long, as shown in FIG. 4, in the main-scanning direction. This is to allow an A3-size original to be read at a resolution of 400 dpi along its shorter side (297 mm long). Each line photosensor is disposed at an interval of 80 μm from its neighbors.

Therefore, the photosensors are away from each other by eight lines for a resolution of 400 dpi in the sub-scanning direction.

A density reproduction method for the printer section of an image processing apparatus according to the present embodiment will be described next.

In the present embodiment, the ON time of the semiconductor laser 213 is controlled according to an image density signal by a pulse-width modulation (PWM) method to implement density reproduction in the printer section. A latent image having a potential corresponding to the laser ON time is formed on the photosensitive drum 217. The developers 219 to 222 develop the latent image with the amount of toner corresponding to the potential of the latent image to implement density reproduction.

Figure 5:
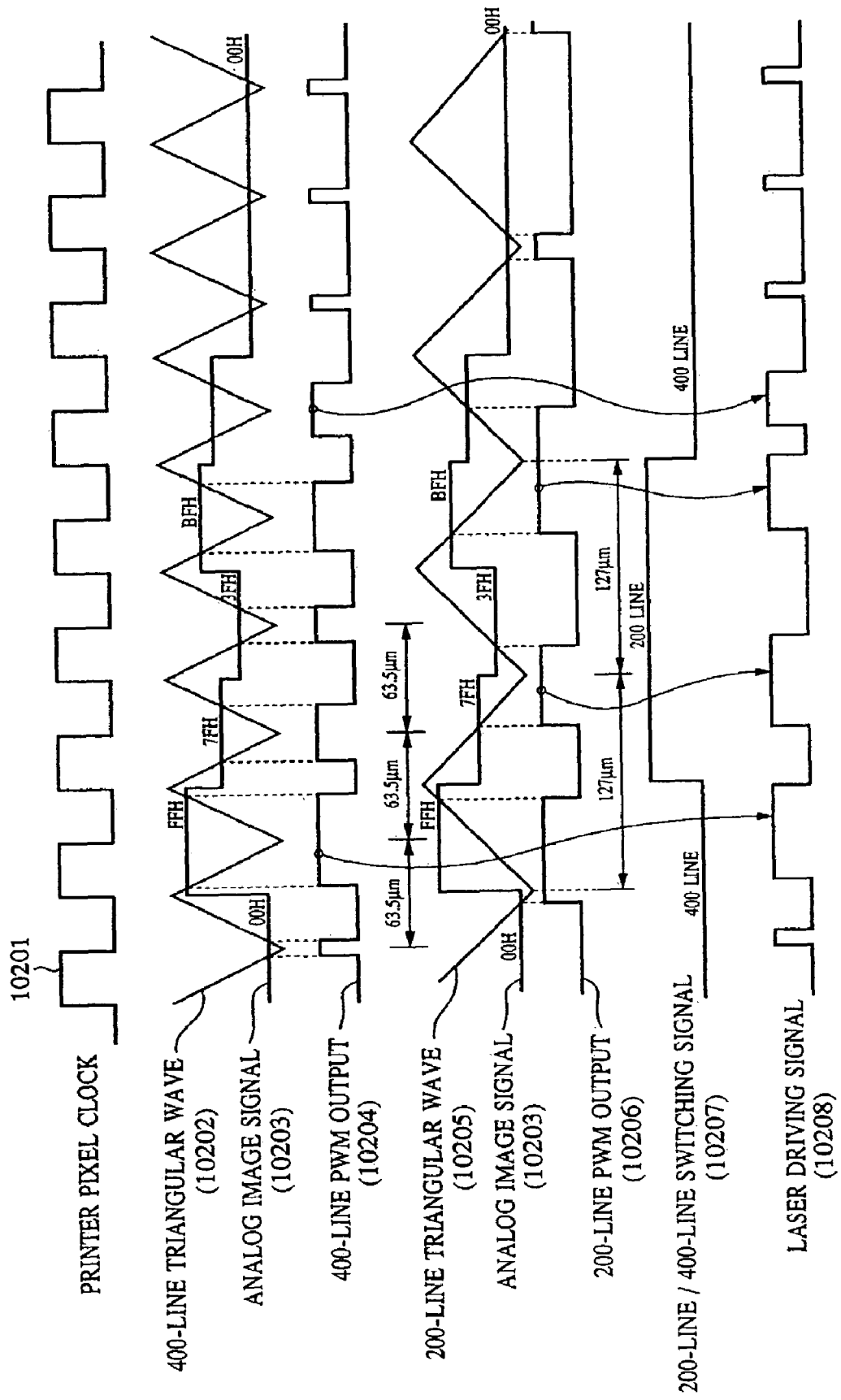
FIG. 5 is a timing chart of a control operation for density reproduction in a printer section.

FIG. 5 is a timing chart of density-reproduction control operations in the printer section according to the present embodiment.

A signal 10201 indicates a printer pixel clock, and corresponds to a resolution of 400 dpi. This clock is generated by the laser driver 212. In synchronization with the printer pixel clock 10201, a 400-line triangular wave 10202 is generated. The period of the 400-line triangular wave 10202 is equal to that of the printer pixel clock 10201.

The signal processing section 209 transmits M, C, Y, and Bk image data having a resolution of 400 dpi and 256 gradations (8 bits) and a 200/400-line switching signal in synchronization with the printer pixel clock signal 10201. Synchronization with the printer pixel clock 10201 is performed by an FIFO memory (not shown) in the laser driver 212. The 8-bit digital image data is converted to an analog image signal 10203 by a D/A converter (not shown). The analog image signal is compared with the 400-line triangular wave 10202 in an analog manner to generate a 400-line PWM output 10204.

The 8-bit digital image data has values ranging from 00H ("H" indicates hexadecimal numbers) to FFH, and the 400-line PWM output 10204 has pulse widths corresponding to the values. The period of the 400-line PWM output corresponds to 63.5 μm on the photosensitive drum.

The laser driver 212 also generates a 200-line triangular wave 10205 having a period twice that of the printer pixel clock 10201 in synchronization with the clock, in addition to the 400-line triangular wave. The 400-dpi analog image signal 10203 is compared with the 200-line triangular wave 10205 to generate a 200-line PWM output signal 10206. The 200-line PWM output signal 10206 generates a latent image on the photosensitive drum at a period of 127 μm, as shown in FIG. 5.

The 200-line PWM output signal implements density reproduction better in gradation than the 400-line PWM output signal because the minimum unit used for density reproduction is 127 μm, which is twice that used by the 400-line PWM output signal. In contrast, in terms of resolution, the 400-line PWM output signal is more suited to high-resolution image recording, which reproduces density in units of 63.5 μm. As described above, 200-line PWM recording is superior in gradation whereas 400-line PWM recording is superior in resolution. Therefore, 200-line PWM recording and 400-line PWM recording are switched according to the nature of an image.

A signal used for this switching is a 200-line/400-line switching signal 10207 shown in FIG. 5, which is sent from the image signal processing section 209 to the laser driver 212 in units of pixels in synchronization with the 400-dpi image signal. When the 200-line/400-line switching signal has logical low level (hereinafter called an "L" level), the 400-line PWM output is selected. When the 200-line/400-line switching signal has logical high level (hereinafter called an "H" level), the 200-line PWM output is selected.

The image signal processing section 209 will be described next.

Figure 6:
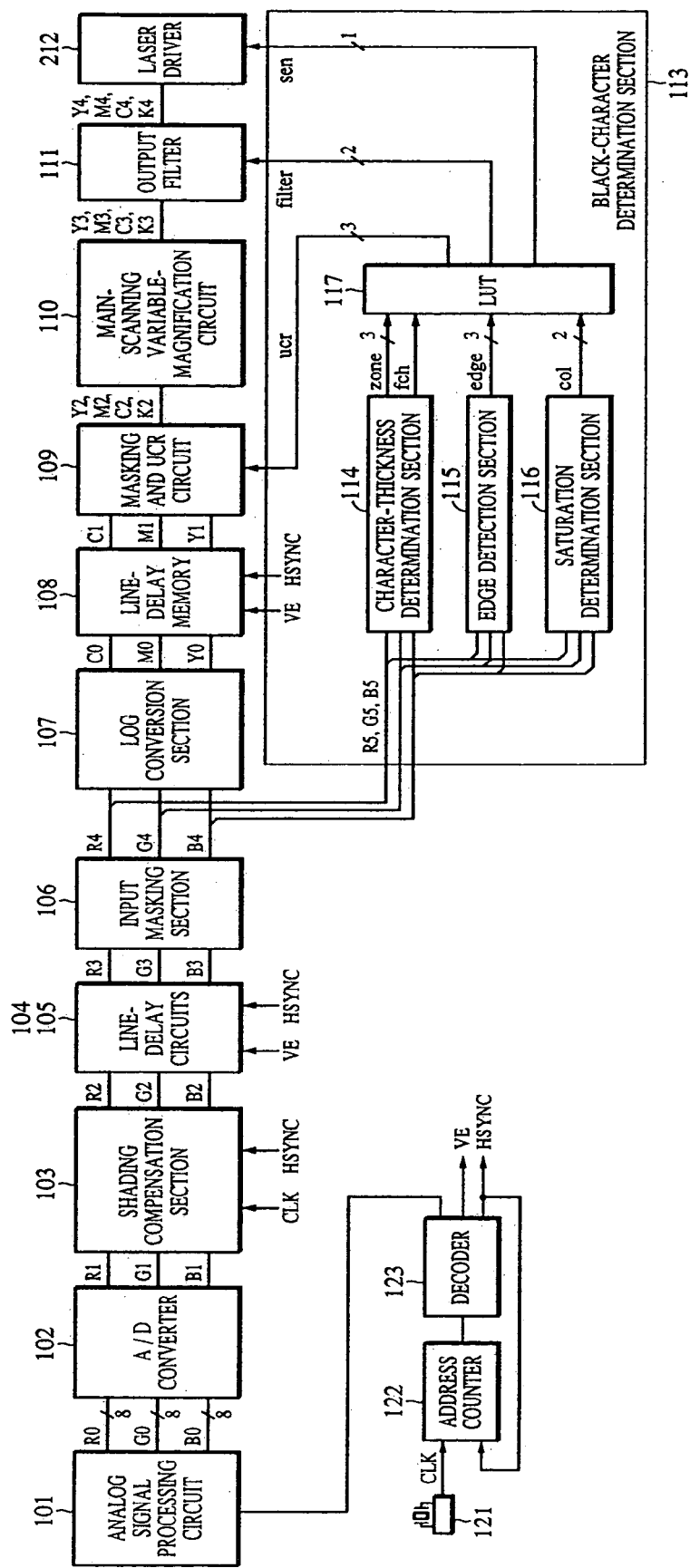
FIG. 6 is a block diagram showing a flow of an image signal in a signal processing section of an image scanner section.

FIG. 6 is a block diagram showing an image-signal flow in the image signal processing section 209 of the image scanner section 201 according to the present embodiment.

As shown in FIG. 6, an image signal output from the CCD 210 is input to an analog signal processing circuit 101 for gain adjustment and offset adjustment. The signal is converted by an A/D converter 102 to 8-bit digital image signals R1, G1, and B1. Then, they are input to a shading compensation section 103 for known shading compensation by the use of a signal read from the standard white-color plate 211 for each color.

A clock generation section 121 generates clock pulses in units of pixels. A main-scanning address counter 122 counts clock pulses sent from the clock generation section 121 to generate a one-line pixel address output. A decoder 123 decodes a main-scanning address sent from the main-scanning address counter 122 to generate CCD driving signals for each line, such as a shift pulse and a reset pulse, and a VE signal indicating an effective area in a one-line read signal sent from the CCD, and a line synchronization signal HSYNC*. The main-scanning address counter 122 is cleared by the HSYNC* signal, and starts counting for the next-line main-scanning address.

Line delay circuits 104 and 105 (shown as one block in FIG. 6) compensate for spatial shifts of the photosensors 2101, 2102, and 2103 shown in FIG. 2 of the CCD 210, in the sub-scanning direction that occur because the photosensors 2101, 2102, and 2103 are disposed a predetermined distance apart from each other. More specifically, the R and G signals are delayed in the sub-scanning direction to match timing with the B signal.

An input masking section 106 converts a reading color space determined by the spectral characteristics of the R, G, and B filters 2107, 2108, and 2109 of the CCD 210 to an NTSC standard color space. The input masking section 106 performs the following matrix calculation.

$$\begin{pmatrix} R4 \\ G4 \\ B4 \end{pmatrix} = \begin{pmatrix} a11 & a12 & a13 \\ a21 & a22 & a23 \\ a31 & a32 & a33 \end{pmatrix} \begin{pmatrix} R3 \\ G3 \\ B3 \end{pmatrix}$$

An amount-of-light/density conversion section (LOG conversion section) 107 is formed of a lookup table ROM. R4, G4, and B4 luminance signals are converted to C0, M0, and Y0 density signals. A line-delay memory 108 delays the C0, M0, and Y0 image signals by a line delay until determination signals such as UCR, FILTER and SEN generated from the R4, G4, and B4 signals by a black-character determination section 113, described later.

As a result, C1, M1, and Y1 image signals for one pixel and a black-character determination signal are input at the same time to a masking and UCR circuit 109.

The masking and UCR circuit 109 extracts a black signal (Bk) from the input three-primary-color, Y1, M1, and C1, signals. The masking and UCR circuit 109 also applies a calculation for compensating for color impurity of recording color members in the printer section 200 to sequentially output Y2, M2, C2, and Bk2 signals at a predetermined bit width (eight-bit width) every time a reading operation is performed.

A main-scanning variable-magnification circuit 110 applies enlargement/reduction processing to image signals and to the black-character determination signal in the main-scanning direction by a known interpolation calculation. A spatial filter processing section (output filter) 111 performs switching of edge enhancement and smoothing processing according to a two-bit FILTER signal sent from an LUT 117, as described below.

Field-sequential M4, C4, Y4, and Bk4 image signals processed in this way and an SEN signal serving as a 200/400-line switching signal are input to the laser driver 212. The printer section 200 performs PWM density recording.

Figure 7:
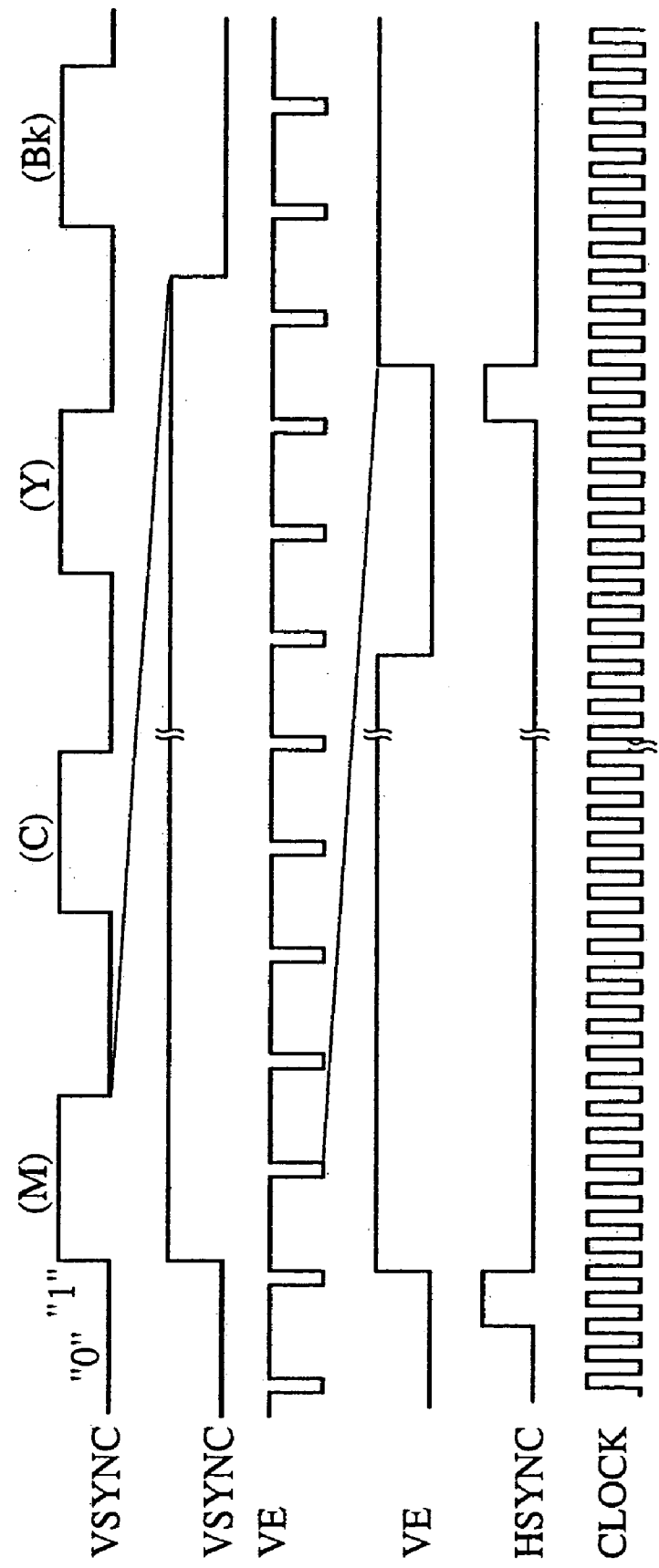
FIG. 7 is a timing chart of control signals used in the signal processing section.

FIG. 7 is a timing chart of control signals in the image signal processing section 209 shown in FIG. 6.

In FIG. 7, a VSYNC signal is a signal indicating an image effective area in the sub-scanning direction. When this signal has logic "1," an image is read (scanned) to sequentially form C, M, Y, and Bk output signals. A VE signal is a signal indicating an image effective area in the main-scanning direction. During when this signal has logic "1," a main-scanning start position is determined. The signal is mainly used for line-count control for a line delay. A CLOCK signal is a pixel synchronization signal. At a rising edge of this signal from "0" to "1," image data is transmitted to the A/D converter 102 and to each signal processing section of the black-character determination section 113. The CLOCK signal is also used for transmitting the image signal and the 200-line/400-line switching signal to the laser driver 212.

A lens characteristic will be described next.

When illumination having a uniform amount of emitted light is prepared at each position in the main-scanning direction, and an image thereof is formed on the CCD line image sensor, the CCD has high illuminance at its central portion and low illuminance at end portions. This distribution of illuminance is known as the cosine biquadrate law. The following countermeasure is taken.

White-color LEDs are used as described below to provide uniform illumination. Blue light or ultraviolet light emitted from white-color LEDs is directed to phosphors to change the wavelength of the light, and is added to other-color light to generate light having visible-light wavelengths, including wavelengths from 400 nm to 700 nm, which is white-color light.

Figure 8:
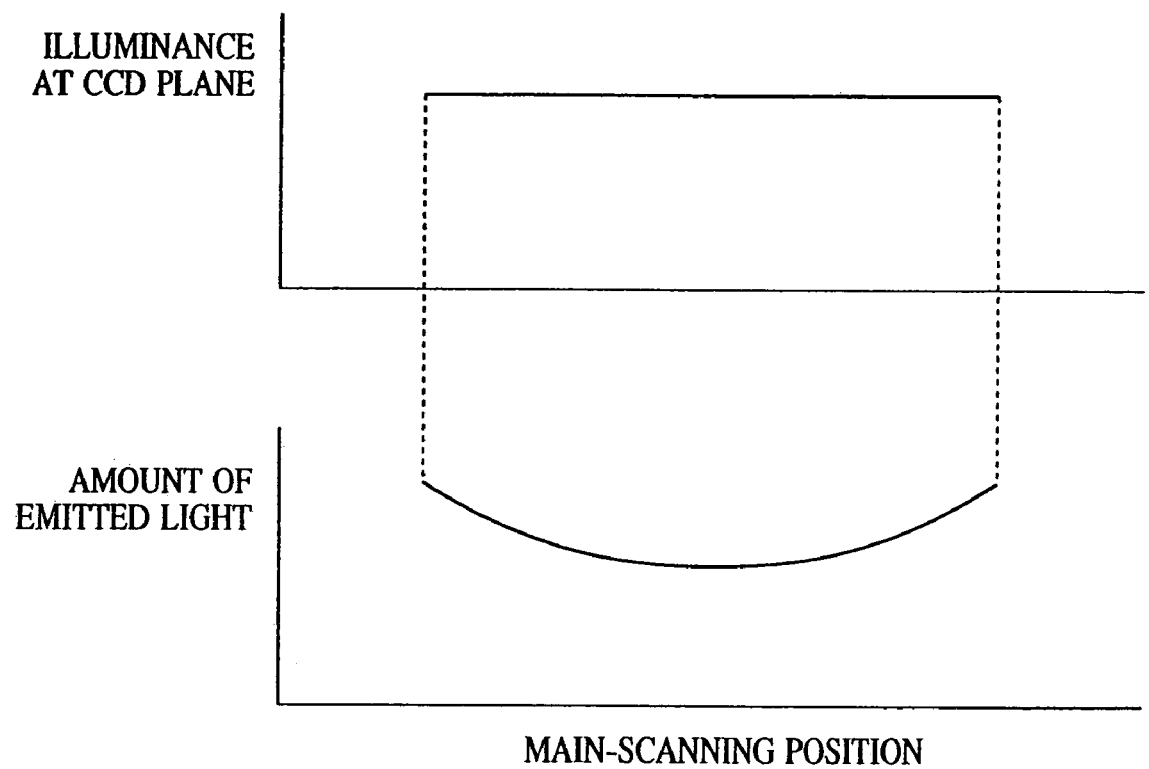
FIG. 8 is a view showing the amount of light emitted from a white-color LED illumination module at main-scanning positions and illuminance at a CCD plane.

FIG. 8 is a view showing the distribution of the amount of light on the CCD image-forming plane.

This figure shows that the CCD has a uniform distribution of the amount of incident light due to a countermeasure taken for the cosine biquadrate law of the lens, described above, because the amount of emitted light is made larger at the end portions than at the central portion in the main-scanning direction.

In the present embodiment, as described above, PWM control is used to make the amount of light larger at the end portions than at the central portion. The method used for providing uniform illumination is not limited to this method, however. The amount of electric power supplied to LEDs may be increased, for example, by increasing the amount of current sent to the LEDs.

A fluorescent lamp is also PWM-controlled, and its control period is about 300 μs, which is almost the same as the main-scanning period. Finer control can be applied to white-color LEDs than to a fluorescent lamp because the LEDs are semiconductor devices and allow high-speed ON/OFF control at the order of 10 ns or less.

Figure 9:
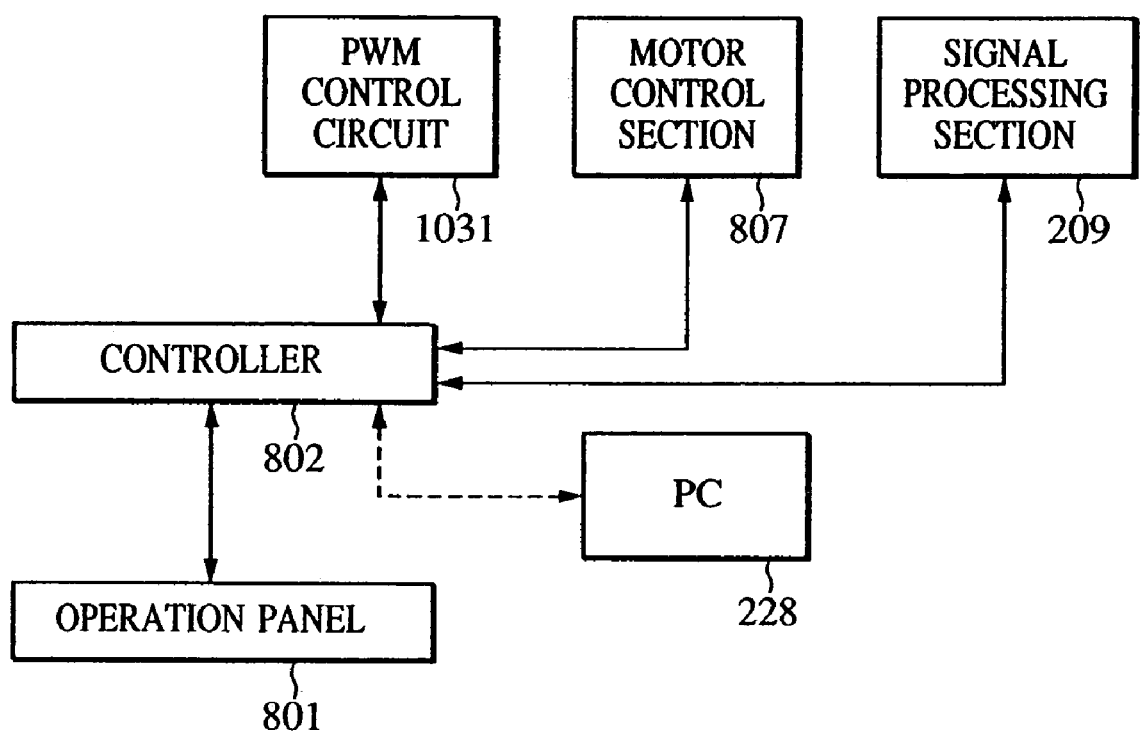
FIG. 9 is a block diagram of the image scanner section.

FIG. 9 is a block diagram of the image scanner section 201 in the present embodiment. An operation panel 801 serves like an operation panel of an image forming apparatus, or like an operation screen of a personal computer. A controller 802 for controlling various functions of the present apparatus controls the settings of the start, the stop, and the operation mode of the apparatus through communications with the operation panel 801 and a personal computer 228. A PWM control circuit 1031 controls ON and OFF of the entire LED module 205 serving as a light source, described later, and also controls the adjustment of the amount of light when the LED module 205 is on. A motor control section 807 controls the driving of a mirror-stand unit which includes the LED module 205, in the sub-scanning direction. The signal processing section 209 has been described above.

Figure 10:
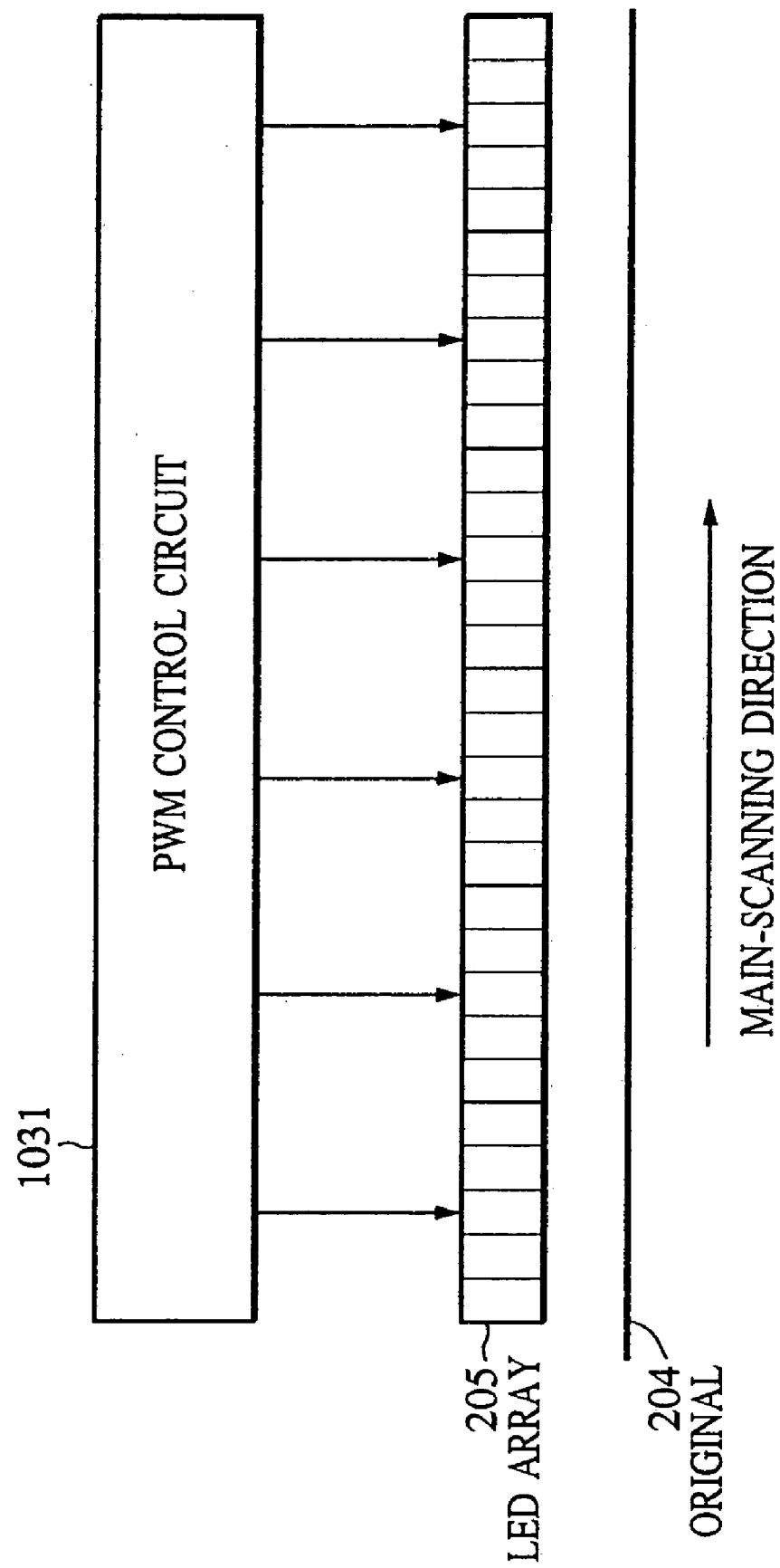
FIG. 10 is a view showing the structure of the white-color LED illumination module.

FIG. 10 is a typical view of the structure of the LED module 205.

The LED module 205 is divided into LED modules ① to ⑥. The PWM control circuit 1031 turns on and applies light-amount control to each of the LED modules ① to ⑥.

Figure 11:
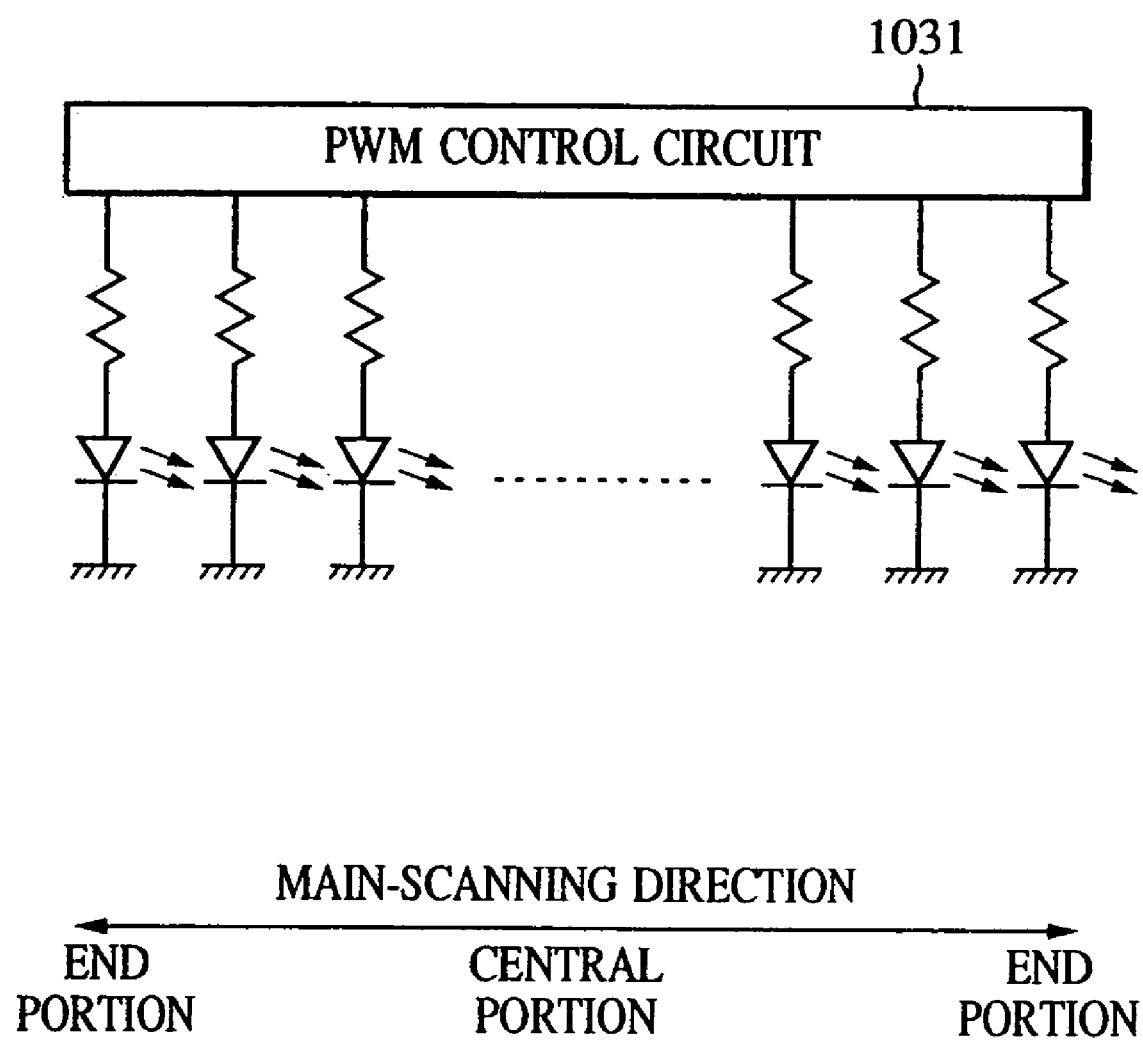
FIG. 11 is a view showing details of the white-color LED illumination module in which a LED string is formed.

FIG. 11 is a view showing a detailed structure of the LED module 205.

The PWM control circuit 1031 is connected to a plurality of LEDs through current-limiting resistors, and makes control means, such as the controller 801 (not shown), specify the duty cycle of each LED.

With this hardware structure, any illumination distribution is made possible. With the use of this structure, the amount of light emitted to the end portions is larger than that to the central portion in the present embodiment.

Figure 12:
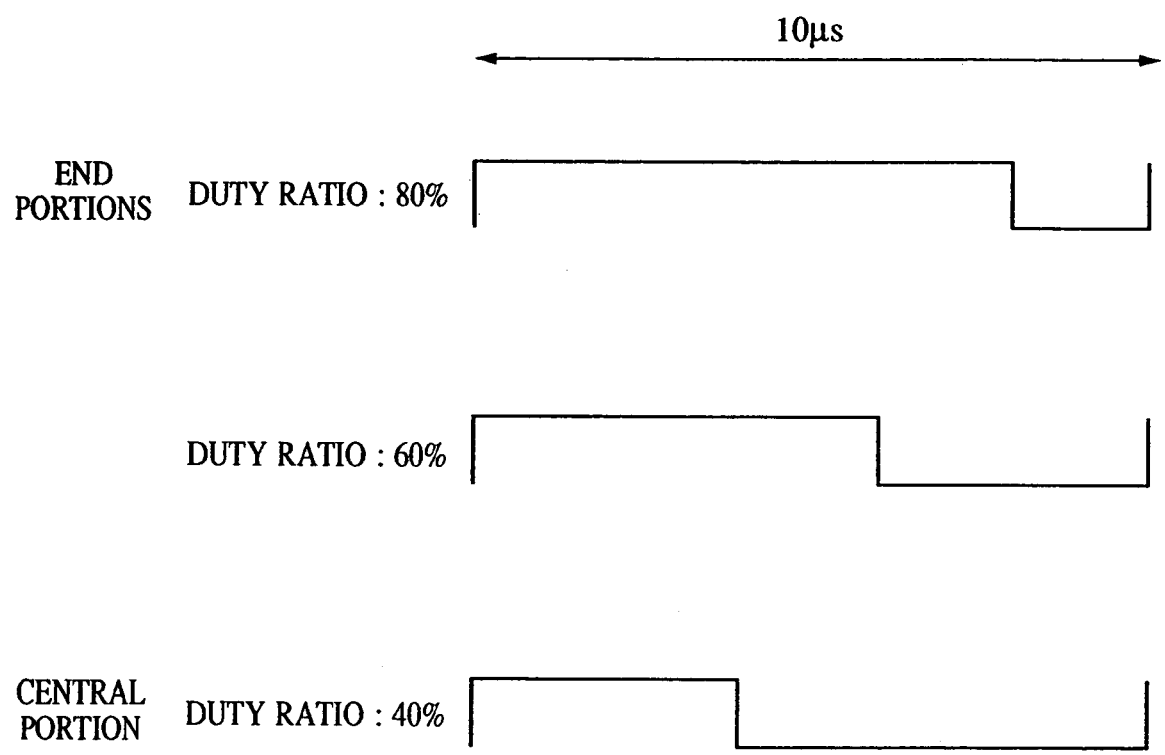
FIG. 12 is a view showing PWM control applied to an LED.

FIG. 12 is a view showing illumination control performed by PWM control.

In the present embodiment, the period of PWM control is set to 10 µs and luminance is increased at the end portions, where a large amount of light is required. To this end, the duty cycle of current which flows into the end portions is made high. In contrast, luminance is reduced at the central portion, where the amount of light needs to be relatively smaller. Therefore, the duty cycle of current which flows into the central portion is made low.

This control can be relative control. In other words, control may be performed such that the amount of light becomes relatively larger at the end portions than at the central portion. Alternatively, control may be performed such that the amount of light becomes relatively smaller at the central portion than at the end portions.

Figure 13:
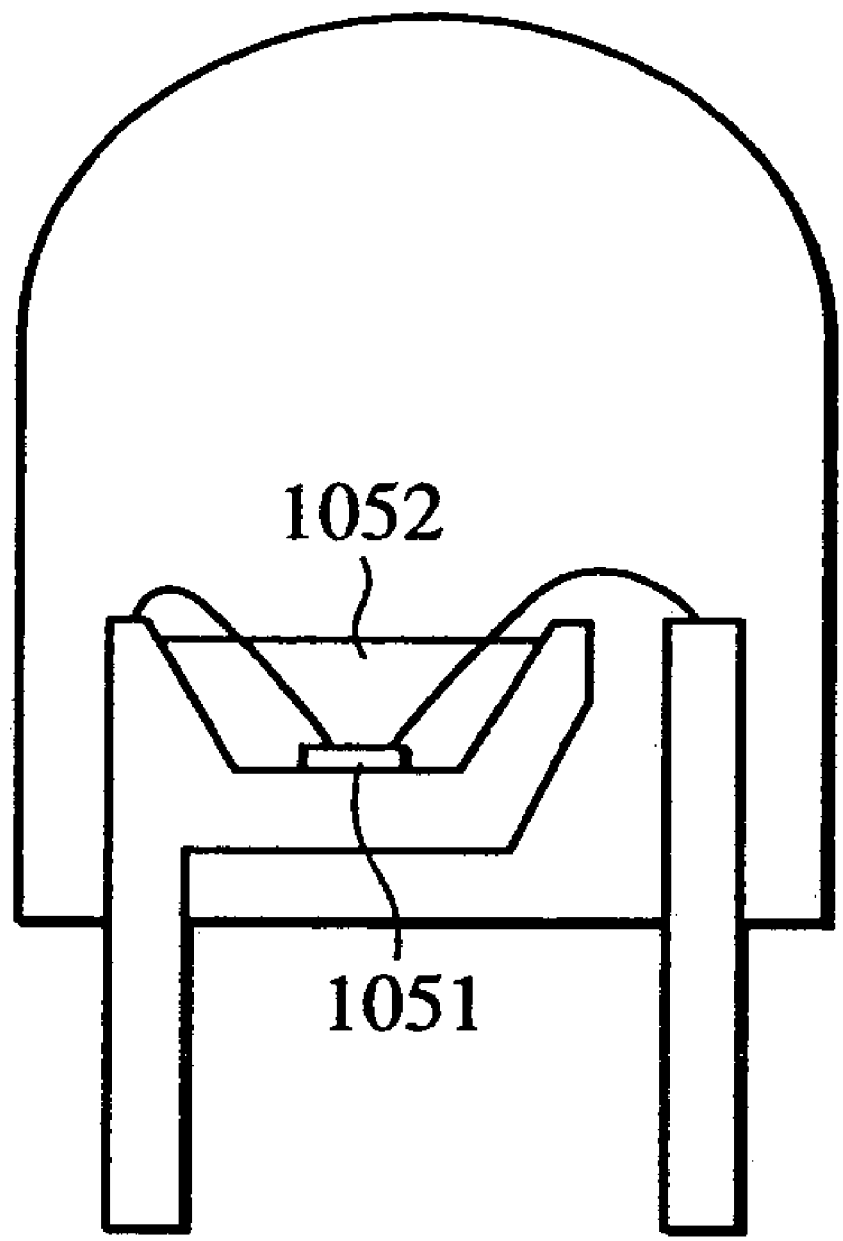
FIG. 13 is a view of the structure of an LED.

FIG. 13 is a view of the structure of a white-color LED in the present embodiment.

A light-source LED 1051 emits blue or ultraviolet light, and a phosphor member 1052 converts the light to light having another wavelength, such as yellow light. A plurality of light components having different wavelengths are added to generate white-color light.

Figure 14:
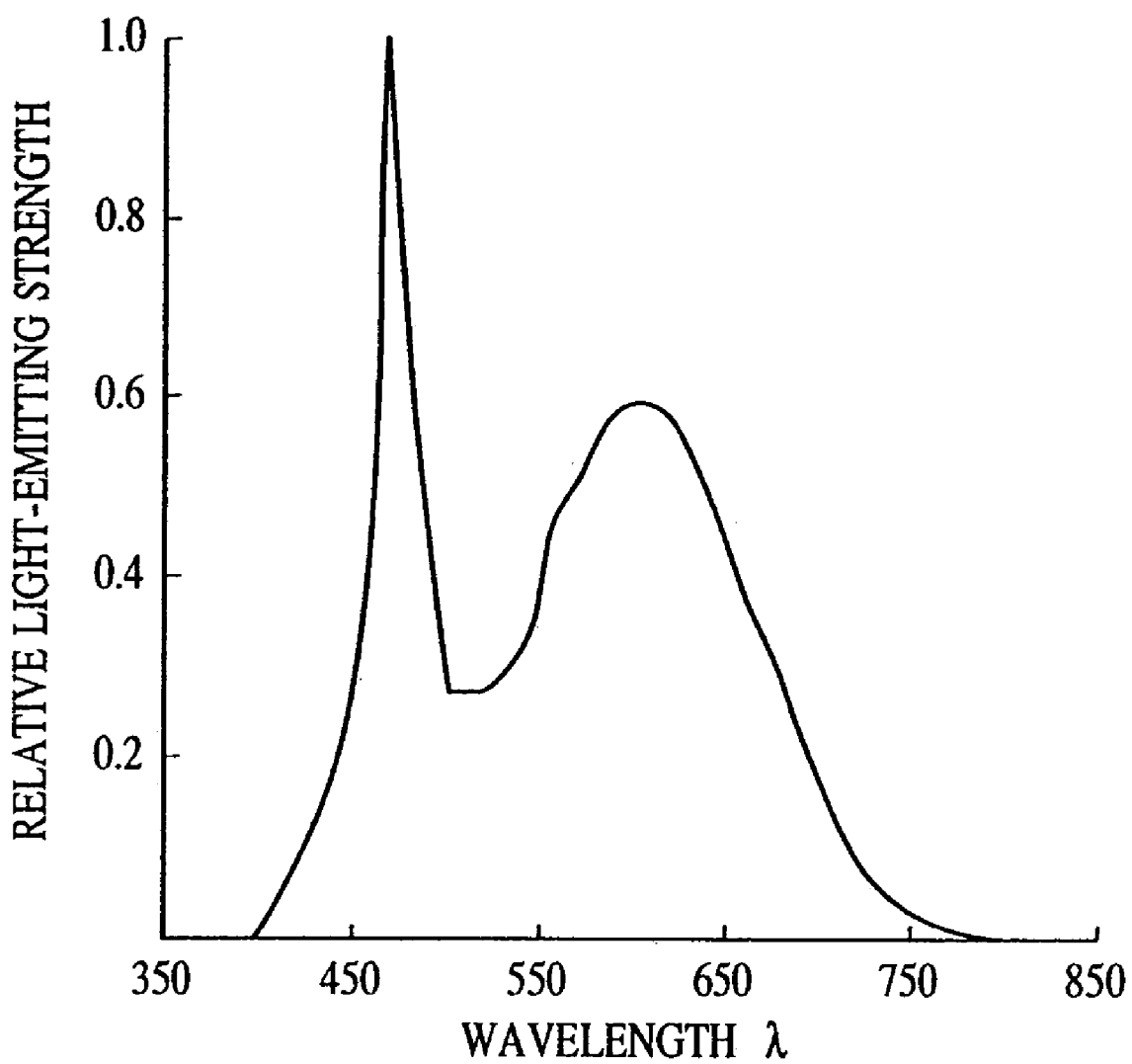
FIG. 14 is a view showing the spectral characteristic of a white-color LED.

FIG. 14 is a view of the spectral characteristics of the white-light LED in the present embodiment.

In FIG. 14, a peak at a blue-light component is generated by the light-source LED 1051 at a shorter-wavelength side, and a broad light component from green to red at a right-hand side is converted from blue by the phosphor member 1052.

Since the light-emission efficiency of the phosphor member is changed according to the wavelength of light emitted from the light source, if the wavelength of light emitted from the light source is slightly changed, the amount of light emitted from the phosphor member is changed accordingly. Therefore, a different color tone is obtained for each white-color LED. For example, a pure-white light, a white light with a yellowish tone, or a white light with a bluish tone is obtained. Since a difference in color tone can be visually recognized, it cannot be ignored, as described above.

Consequently, as described below, LEDs (even white-light LEDs of the same type) are classified into several groups according to their color-tone ranks.

Figure 15:
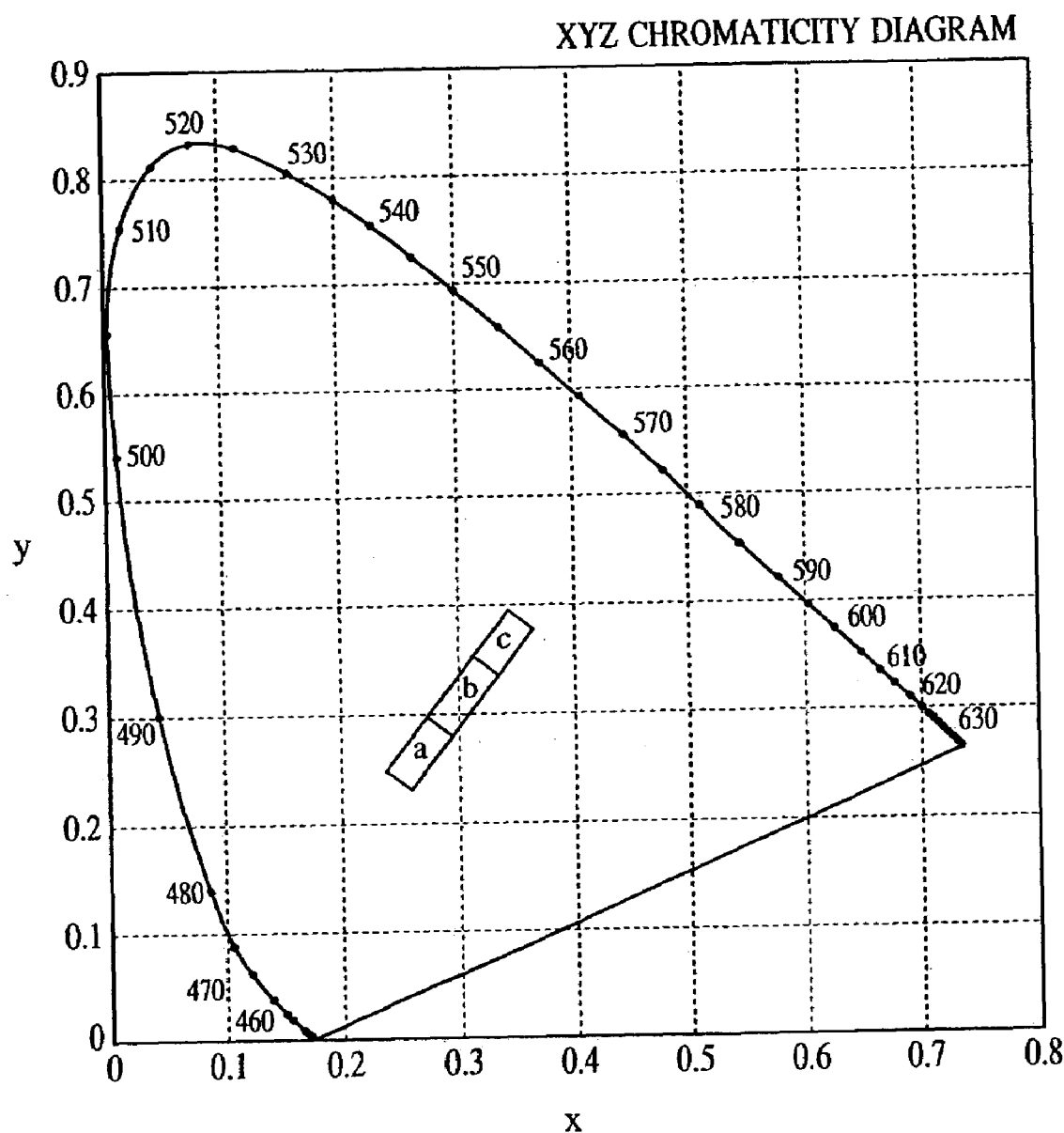
FIG. 15 is a view showing color-tone ranks of white-color LEDs on a chromaticity diagram.

FIG. 15 is a CIE chromaticity diagram (with XYZ chromaticity coordinates).

In this figure, LEDs have three color-tone ranks "a," "b," and "c" in the chromaticity diagram. Variations in color tone are not at random but are about on a monotonic-increasing straight line in the XYZ chromaticity coordinates.

When a color image is read without taking color variations of white-color LEDs into consideration, color-tone variations occur in the main-scanning direction. In addition, since color-tone variations occur also for each LED module, color-reading quality deteriorates.

According to an embodiment of the present invention, the following structure is used to solve the above-described problems.

The LED module 205 is made to be formed of LEDs having the same color-tone rank. In the present embodiment, LEDs are classified into groups having three ranks according to their XYZ chromaticity coordinates 104 by measuring the chromaticity values XYZ of the LEDs by means of a colorimeter. The number of ranks can be increased to make color tone more precisely uniform.

<Forming a Light-Source Module with Only LEDs Having the Same Rank>

It is assumed that LEDs are classified into groups by color-tone ranks as described above, and a light-source module is formed only by LEDs having the same rank.

Forming a light-source module only by LEDs having the same rank suppresses variations in color tone in a read image. More precisely, a problem is avoided in which, when an image is read in a condition that LED having different color tones are disposed at random, the read image has considerably different color tones in the main-scanning direction. In other words, since the light-source module is formed of LEDs having the same rank only, variations in color tone are avoided in the main-scanning direction.

In this case, since a plurality of light-source modules constituting the LED module 205 have different color tones from each other, the LED module 205 causes variations in color tone as a whole. There is a way to select the above-described idea that LEDs having different color-tone ranks are not used, but yield is low and the apparatus becomes expensive.

<Changing a Parameter for Color-Calculation Means According to the Rank>

In the present embodiment, LEDs having various color-tone ranks are used and the following structure is employed.

Setting means for setting the color-tone rank of a white-color-LED light-source module to be used, and control means for switching a parameter of matrix color calculation means, described later, according to the color-tone rank.

Figure 16:
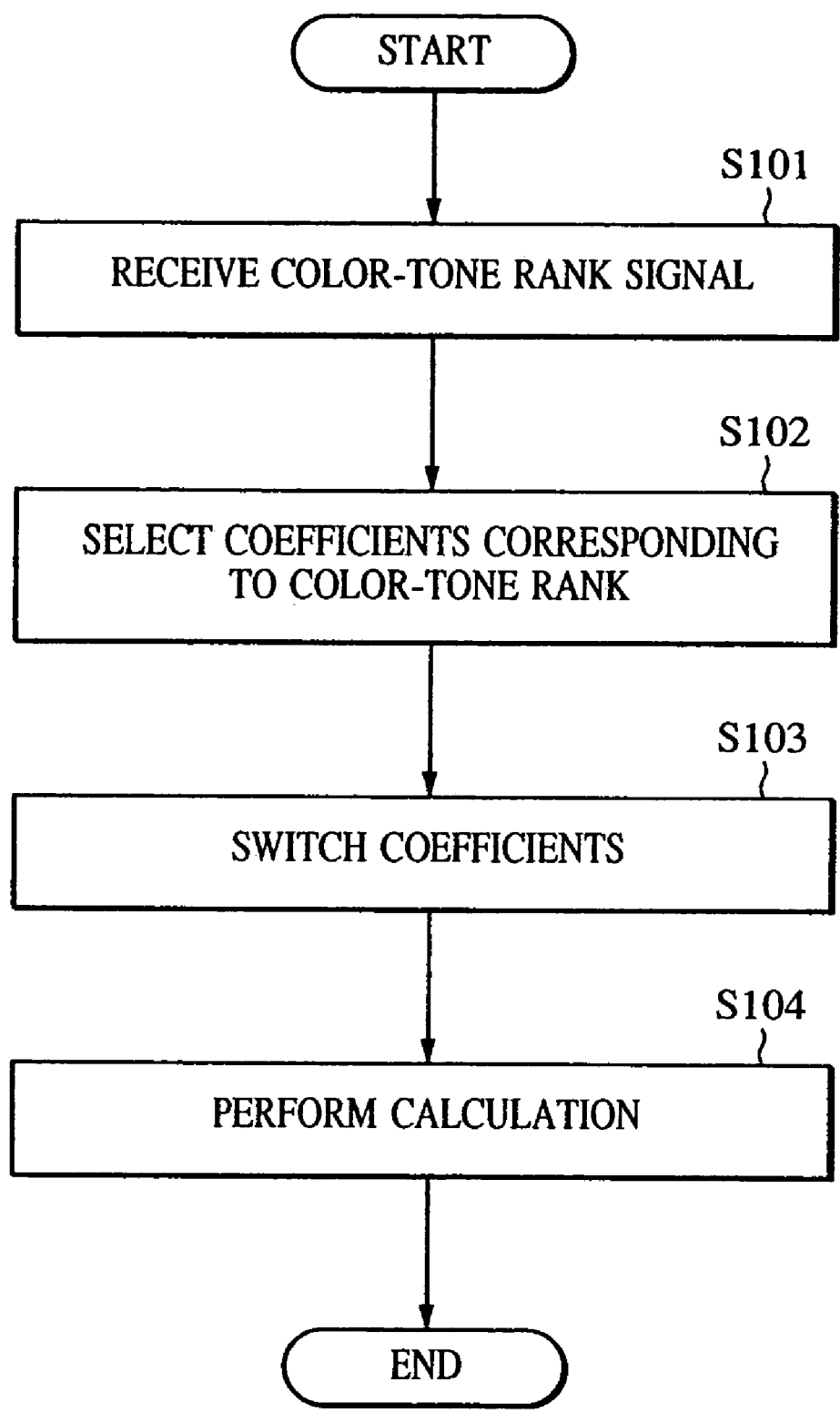
FIG. 16 is a flowchart of rank classification.

FIG. 16 is a flowchart of rank classification according to the present embodiment. The following processing is performed under the control of the controller 802.

A color-tone rank signal is received from the operation panel 801 or others as the color-tone rank of the light-source module used (in step S101). In the present embodiment, a setting performed by the operator is used. The operator can be prevented from performing troublesome work when a light-source module has rank information magnetically, electrically, or optically and means for automatically sending the rank information if the light-source module is mounted.

According to the color-tone rank information, the color calculation means removes a difference in color tone of a read image, caused by a difference in the color-tone rank of the light-source module. Coefficients for the input masking section 106, corresponding to the received color-tone rank information are selected (in step S102). The selected coefficients are switched as input masking coefficients (in step S103). In the present embodiment, the coefficients of the input masking section 106 are switched to appropriate coefficients corresponding to rank classification. With the use of the masking coefficients, the above-described calculation is performed (in step S104).

In the present embodiment, three by three masking coefficients are prepared such that any color-tone rank of the LED light-source module can be converted to a value in a National Television Standards Committee (NTSC) reference color space. The above-described matrix calculation is performed in as follows:

$$\begin{pmatrix} R4 \\ G4 \\ B4 \end{pmatrix} = \begin{pmatrix} a11 & a12 & a13 \\ a21 & a22 & a23 \\ a31 & a32 & a33 \end{pmatrix} \begin{pmatrix} R3 \\ G3 \\ B3 \end{pmatrix}$$

The matrix calculation is performed for a first-order term. Precision can be increased when the order is increased, for example, to include a second-order term.

It is better if color-space direct mapping is employed by the use of a three-dimensional look-up table.

The RGB components are output in the NTSC color space because it is assumed that an input format of the present embodiment, used for RGB-CMYK conversion means for the printer requires a color space similar to the NTSC color space.

According to the present embodiment described above, when a white-color LED illumination module is used as a light source for a color-image reading apparatus, the deterioration of read-image quality, caused by LED color-tone variations is suppressed. In addition, by using LEDs having the same color-tone rank, color-tone variations in the main-scanning direction-can be suppressed in a module. Further, even if LED illumination modules having a plurality of color-tone ranks are used, the color-tone ranks are specified so that the color calculation means can absorb the differences thereamong. Therefore, a color original image can be read at the same color tone even by any of the plurality of illumination modules.

<Changing Masking Coefficients Depending on a Main-Scanning Position>

Even when white-color LEDs having the same rank are used, if a rank classification standard is made loose due to yield, white-level color-tone variations may occur slightly. Even in this case, better color reading can be performed by the following structure.

Even when white-color LEDs having different ranks are used together, one can still aim to enjoy the advantage of suppressing deterioration of quality caused by LED color-tone variations. In this case, since rank classification is not needed, cost reduction can also be a realistic target.

Figure 17:
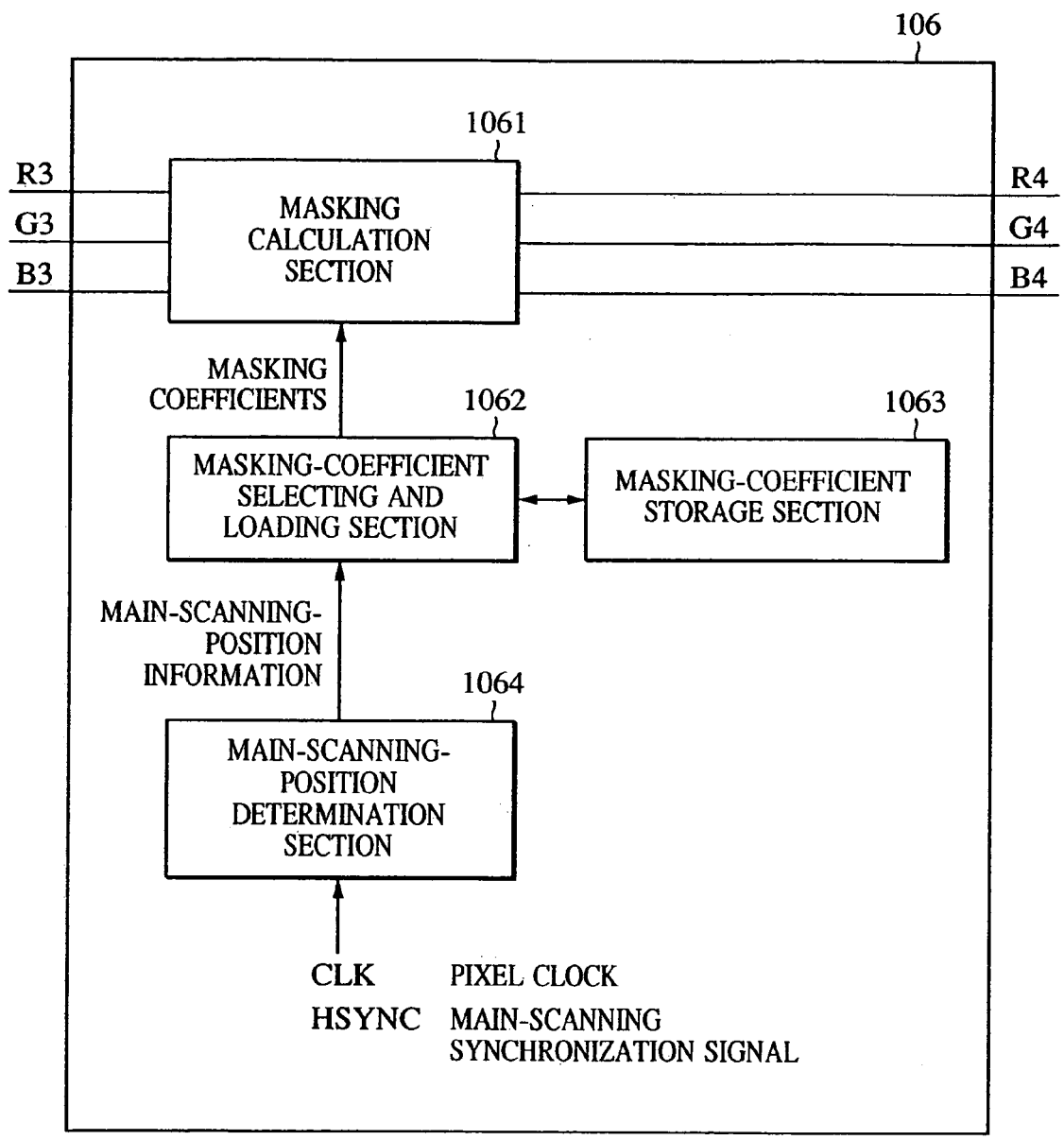
FIG. 17 is a view showing details of an input masking section.

FIG. 17 is a view showing a structure in which masking coefficients can be changed according to the main-scanning position.

Changes in color depending on main-scanning positions are measured by reading a managed standard white-color plate 211 in advance with the use of the target LED module 205. With this operation, changes in the color-tone characteristic of the light source depending on positions in the main-scanning direction can be measured in units of pixels. In response to the color-tone changes of the light source depending on main-scanning positions, obtained in this way in units of pixels, appropriate masking coefficients depending on the main-scanning positions are obtained in units of pixels.

The obtained masking coefficients are given to an image reading apparatus having the LED module 205, as data unique to the LED module 205. More specifically, the masking coefficients depending on the main-scanning positions are stored in a masking-coefficient storage section 1063 shown in FIG. 17.

A main-scanning-position determination section 1064 receives a main-scanning synchronizing signal HSYNC and a pixel clock CLK, and outputs information, including main-scanning-position information indicating that the information of which main-scanning position is currently being processed during image reading.

A masking-coefficient selecting and loading section 1062 reads the masking coefficients corresponding to the main-scanning position being currently processed, in units of pixels from the masking-coefficient storage section 1063 according to the main-scanning-position information, and inputs them into a masking calculation section 1061. The masking calculation section 1061 performs the three-by-three matrix calculation, described above, in units of pixels.

The structure in which the masking coefficients are calculated in units of pixels has been described. Masking coefficients corresponding to main-scanning positions do not need to be prepared for all pixels, as described in the section "Changing a parameter for color-calculation means according to the rank". For example, an effective structure is provided in which masking coefficients for six representative points in the main-scanning direction are stored for each of the LED modules ① to ⑥. This means that masking coefficients for points disposed between representative points can be obtained by interpolation calculated by a masking-coefficient calculation section (not shown). In this case, the structure can be simplified if the standard white-color plate 211 is read such that rank classification is performed for each of the LED modules ① to ⑥ and masking coefficients corresponding to each of the LED modules ① to ⑥ are obtained.

Even when the white-color LED chips mounted in the LED module 205 do not have completely the same color tone, an image can be read with precise color quality by the structure and procedure of the present embodiment.

<Other Embodiments>

In the above embodiment, the PC 228 shown in FIG. 9 is connected through SCSI. The connection interface standard is not limited to this case. Other known standards may be used.

The present invention can also be applied to a system formed of a plurality of units (such as a host computer, an interface units, and a scanner), and can further be applied to an apparatus (such as a copying machine or a facsimile machine) formed of one unit.

An object of the present invention is also achieved in a case in which a storage medium (or a recording medium) storing a program code of software which implements the functions described in the above embodiments is supplied to a system or to an apparatus, and a computer (or a CPU or a MPU) of the system or the apparatus reads the program code stored in the storage medium and executes it. In this case, since the program code itself read from the storage medium implements the functions described in the above embodiments, the storage medium storing the program code is a part of the present invention. The present invention includes not only a case in which the computer executes the read program code to implement the functions described in the above embodiments, but a case in which an operating system (OS) running on the computer executes the whole or a part of actual processing according to the instructions of the program code to implement the functions described in the above embodiments. As a storage medium storing the program code, a floppy disk, a hard disk, a ROM, a RAM, a magnetic tape, a non-volatile memory card, a CD-ROM, a CD-R, a DVD, an optical disk, a magneto-optical disk, or others can be considered.

The present invention also includes a case in which the program code read from the storage medium is written into a memory provided for a function extension card inserted into the computer or provided for a function extension unit connected to the computer, and then, a CPU provided for the function extension card or the function extension unit performs the whole or a part of actual processing to implement the functions described in the above embodiments.

When the present invention is applied to the storage medium, the storage medium stores a program code corresponding to the flowchart shown in FIG. 16 and described above.

As described above, according to preferred embodiments of the present invention, even when an image is read by the use of illumination means having color-tone variations, the deterioration of reading quality can be suppressed.

When masking coefficients are changed according to main-scanning positions, the deterioration of image quality caused by the color-tone variations of LED light sources can be preferably suppressed.

As many apparently widely different embodiments of the present invention can be made without departing from the spirit and scope thereof, it is to be understood that the invention is not limited to the specific embodiments thereof, but only by the claims.

What is claimed is:

1. An image reading apparatus comprising:
   a linear photoelectric conversion unit formed of a plurality of light-receiving elements arranged along a main scanning direction, wherein said conversion unit reads an original image and outputs color image signals;
   an illumination unit formed of a plurality of light sources for illuminating the original image, the plurality of light sources being arranged along the main scanning direction so that each light source is located at a different position from the other light sources in the main scanning direction; and
   a color-tone compensation unit which compensates for a color-tone of the color image signals according to a main scanning position.

2. An image reading apparatus according to claim 1, wherein said color-tone compensation unit compensates the color-tone of the color image signals for each of said plurality of light sources.

3. An image reading apparatus according to claim 1, wherein said illumination unit has a plurality of groups each formed of a respective plurality of said light sources, and said color-tone compensation unit compensates the color-tone of the color image signals for each of the groups.

4. An image reading apparatus according to claim 1, wherein said color-tone compensation unit compensates the color-tone of the color image signals using a matrix coefficient.

5. An image reading apparatus according to claim 1, wherein said color-tone compensation unit changes masking coefficients of a matrix used to operate on a color tone rank of the color image signals according to the main scanning position to compensate for the color-tone of the color image signals according to the main scanning position.

6. A control method for an image reading apparatus having a linear photoelectric conversion unit formed of a plurality of light-receiving elements arranged along a main scanning direction, and an illumination unit formed of a plurality of light sources, the plurality of light sources being arranged along the main scanning direction, so that each light source is disposed at a different position from the other light sources in the main scanning direction, said control method comprising the steps of:
   illuminating an original image using light from the plurality of light sources disposed at different positions in the main scanning direction;
   reading the original image using light from the plurality of spaced apart light sources disposed at different positions in the main scanning direction and using the linear photoelectric conversion unit and outputting color image signals; and
   compensating for a color-tone of the color images signals according to a main scanning position.

7. A control method according to claim 6, wherein the color-tone of the color image signals is compensated for each of the plurality of light sources.

8. A control method according to claim 6, wherein the illumination unit has a plurality of groups each formed of a respective plurality of the light sources, and the color-tone of the color image signals is compensated for each of the groups.

9. A control method according to claim 6, wherein the color-tone of the color image signals is compensated using a matrix coefficient.

10. A storage medium storing a program capable of being executed by an information processing apparatus, having a program code used for implementing an image processing method described in claim 6.

11. A control method according to claim 6, wherein said compensating step comprises the step of changing masking coefficients of a matrix used to operate on a color tone rank of the color image signals according to the main scanning position to compensate for the color-tone of the color image signals according to the main scanning position.

* * * * *

UNITED STATES PATENT AND TRADEMARK OFFICE
CERTIFICATE OF CORRECTION

PATENT NO.       : 7,173,234 B2                                     Page 1 of 1
APPLICATION NO.  : 10/886674
DATED            : February 6, 2007
INVENTOR(S)      : Kenji Hiromatsu It is certified that error appears in the above-identified patent and that said Letters Patent is hereby corrected as shown below:

COLUMN 3:

Line 39, "in." should read --in--.

COLUMN 4:

Line 36, "(useless" should read --(more useful--.

COLUMN 8:

Line 21, "when this signal" should read --this signal when it--.

COLUMN 11:

Line 41, "direction-can" should read --direction can--.

COLUMN 12:

Line 56, "units," should read --unit,--.

COLUMN 13:

Line 47, "arranged" should read --spaced apart--.

COLUMN 14:

Line 21, "arranged" should read --spaced apart--.

Signed and Sealed this

Fifth Day of January, 2010

David J. Kappos
*Director of the United States Patent and Trademark Office*